(12) United States Patent
Aoki (10) Patent No.: US 11,213,164 B2
(45) Date of Patent: Jan. 4, 2022

(54) COOKING DEVICE (71) Applicant: DENTSU INC., Tokyo (JP)

(72) Inventor: Kengo Aoki, Tokyo (JP)

(73) Assignee: DENTSU INC., Tokyo (JP)

( * ) Notice: Subject to any disclaimer, the term of this patent is extended or adjusted under 35 U.S.C. 154(b) by 231 days.

(21) Appl. No.: 16/237,423

(22) Filed: Dec. 31, 2018

(65) Prior Publication Data

US 2019/0231120 A1 Aug. 1, 2019

(30) Foreign Application Priority Data

Jan. 26, 2018 (JP) .............................. JP2018-011685

(51) Int. Cl.
*A47J 36/02* (2006.01)
*A47J 36/04* (2006.01)
*A47J 27/12* (2006.01)

(52) U.S. Cl.
CPC ............. *A47J 36/022* (2013.01); *A47J 36/04* (2013.01); *A47J 27/12* (2013.01)

(58) Field of Classification Search
CPC .. A47J 33/00; A47J 36/00; A47J 36/02; A47J 36/022; A47J 36/04; A47J 36/06
See application file for complete search history.

(56) References Cited

U.S. PATENT DOCUMENTS

| 5,721,022 A | * | 2/1998 | Morita | ................... | A47J 36/022 |
| | | | | | 229/406 |
| 5,989,616 A | | 11/1999 | Bouton-Hughes | | |
| 2002/0185013 A1 | * | 12/2002 | London | ................. | A47J 36/022 |
| | | | | | 99/450 |

FOREIGN PATENT DOCUMENTS

| CN | 1190374 A | | 8/1998 |
| CN | 2429078 Y | | 5/2001 |
| CN | 201759330 U | | 3/2011 |
| CN | 202365591 U | | 8/2012 |
| CN | 204743720 U | | 11/2015 |
| CN | 205251207 U | | 5/2016 |
| JP | 3013843 U | | 5/1995 |
| JP | H07-036940 U | | 7/1995 |
| JP | H0736940 U | * | 7/1995 |
| JP | 2007284112 A | * | 11/2007 |
| JP | 2007284112 A | | 11/2007 |
| JP | 2011120806 A | | 6/2011 |

(Continued)

OTHER PUBLICATIONS

An Office Action mailed by the Japanese Patent Office dated Dec. 17, 2019, which corresponds to Japanese Patent Application No. 2018-011685 with English Translation.

(Continued)

*Primary Examiner* — Steven A. Reynolds
*Assistant Examiner* — Javier A Pagan
(74) *Attorney, Agent, or Firm* — Studebaker & Brackett PC (57) ABSTRACT

There is provided a cooking device that is capable of heating and cooking ingredients by burning altogether with the cooking device.

A cooking device 1 includes a main body 3 that has a concave part 2 in which cooking ingredients are to be stored and a lid body 4 that covers the concave part 2. The main body 3 and the lid body 4 are formed from flammable material. With the ingredients stored in the concave part 2 and the concave part 2 covered with the lid body 4, the cooking device 1 is burned to heat and cook the ingredients.

9 Claims, 10 Drawing Sheets

(56) References Cited

FOREIGN PATENT DOCUMENTS

JP          2011-195170 A      10/2011
KR          20-0477897 Y1      8/2015

OTHER PUBLICATIONS

An Office Action mailed by the Japanese Patent Office dated Apr. 7, 2020, which corresponds to Japanese Patent Application No. 2018-011685 with English translation.
An Office Action mailed by China National Intellectual Property Administration dated Jan. 18, 2021, which corresponds to Chinese Patent Application No. 201910039167.1 and is related to U.S. Appl. No. 16/237,423; with English language translation.
Silla Supermarket of South Korea Paper Cooking Pot; "https://jingyan.baidu.com/article/fc07f9895fce2712fee51963.html"; Baidu web page; Jul. 18, 2017; South Korea.
Yixuan Jiang; "Boil eggs with a paper pot"; Yilin Magazine (Junior Version); China Academic Journal Electronic Publishing House; Apr. 8, 2016; China.
An Office Action mailed by China National Intellectual Property Administration dated Aug. 19, 2021, which corresponds to Chinese Patent Application No. 201910039167.1 and is related to U.S. Appl. No. 16/237,423; with English language translation.

\* cited by examiner

COOKING DEVICE

BACKGROUND

Technical Field

The present invention relates to a cooking device that can heat and cook ingredients by burning altogether with the cooking device.

Related Art

There have been conventionally suggested pots made of paper material (for example, refer to Japanese Registered Utility Model No. 3013843 and JP H7-36940 Y). The conventional pots have a bottom made of fire-proof paper material. The fire-proof paper material includes paper material that can withstand the temperature of flames generated from a solid fuel (about 800 degrees), for example. In the case of using such a conventional pot, ingredients such as tofu and water for soup are put into the pot, and the bottom of the pot is put on fire to heat and cook the ingredients and soup in the pot.

SUMMARY

However, the conventional pots made of paper material are used in the same manner as earthen pots and metal pots, which is less than fun. Accordingly, there is a demand for cooking devices that are used in an unprecedentedly new way.

The present invention has been made in view of the foregoing issue, and an object thereof is to provide a cooking device that can heat and cook ingredients by burning altogether with the cooking device.

The cooking device of the present invention includes: a main body that has a concave part in which cooking ingredients are to be stored; and a lid body that covers the concave part. The main body and the lid body are formed from flammable material. With the ingredients stored in the concave part and the concave part covered with the lid body, the cooking device is burned to heat and cook the ingredients.

According to this configuration, the main body and the lid body of the cooking device are formed from flammable material. Thus, with the ingredients stored in the concave part in the main body of the cooking device and the concave part covered with the lid body, the ingredients can be heated and cooked by being put on fire and burned altogether with the cooking device.

In the cooking device of the present invention, the flammable material may be paper material, wood material, or plant-derived material.

According to this configuration, as the flammable material for the main body and lid body of the cooking device, paper material such as cardboard, wood material such as balsa, or plant-derived material such as straw can be used. The plant-derived material can be plant-derived plastic or the like.

In the cooking device of the present invention, the flammable material may be material that emits no toxic substance when being burned.

According to this configuration, the main body and the lid body of the cooking device are formed from the material that emits no toxic substance when being burned (for example, no adhesive is used). Thus, when the ingredients are heated and cooked by burning altogether with the cooking device, the cooking device emits no toxic substance with improvement in safety and security.

In the cooking device of the present invention, the sizes of the main body and the lid body may be determined in accordance with heating and cooking time of the ingredients.

According to this configuration, the size of the main body (the diameter and height of the main body) and the size of the lid body (the diameter of the lid body) of the cooking device are determined in accordance with the heating and cooking time of the ingredients. This makes it possible to heat and cook the ingredients in an appropriate heating and cooking time only by burning the cooking device.

In the cooking device of the present invention, the thicknesses of the main body and the lid body may be determined in accordance with the heating and cooking time of the ingredients.

According to this configuration, the thicknesses of the main body and the lid body of the cooking device are determined in accordance with the heating and cooking time of the ingredients. This makes it possible to heat and cook the ingredients in an appropriate heating and cooking time only by burning the cooking device.

According to the present invention, it is possible to heat and cook ingredients by burning altogether with the cooking device.

DETAILED DESCRIPTION

A cooking device in an embodiment of the present invention will be described below with reference to the drawings. The cooking device in the present embodiment is a cooking device used as a camping gear, an outdoor gear, or the like as an example.

Figure 1:
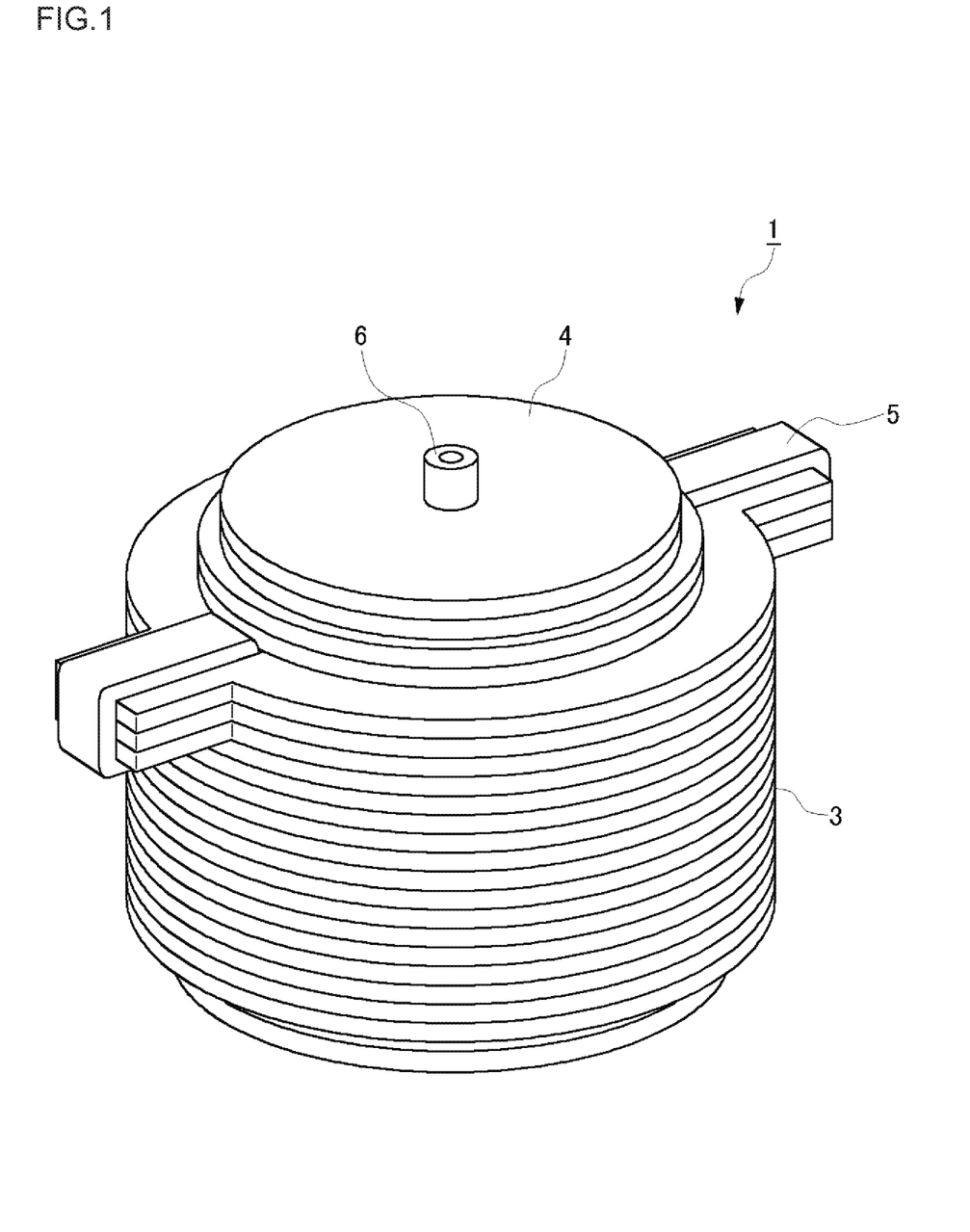
FIG. 1 is a perspective view of a cooking device in an embodiment of the present invention.
Figure 2:
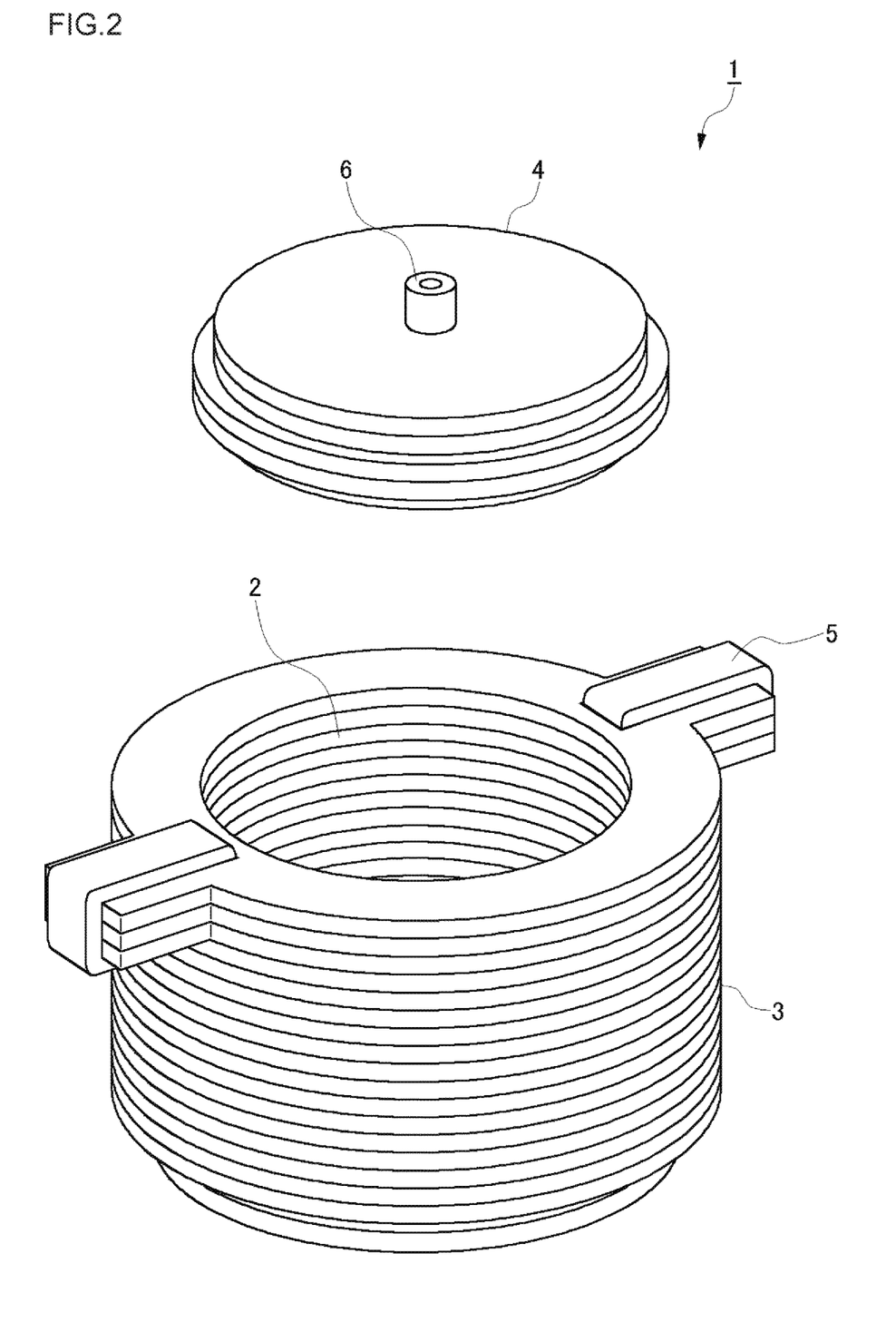
FIG. 2 is an exploded perspective view of the cooking device in the embodiment of the present invention.

A configuration of the cooking device in the embodiment of the present invention will be described with reference to the drawings. FIG. 1 is a perspective view of the cooking device in the present embodiment, and FIG. 2 is an exploded perspective view of the cooking device in the present embodiment. As illustrated in FIGS. 1 and 2, a cooking device 1 in the present embodiment has the shape of a pot. Specifically, the cooking device 1 includes a main body 3 that has in the center a concave part 2 where cooking ingredients (not illustrated) are to be stored and a lid body 4 that covers the concave part 2. The main body 3 has the shape of a bottomed cylinder. The main body 3 has a pair of right and left handles 5 protruding outward from the both sides of the upper part. The lid body 4 has the shape of a disc and has a knob 6 protruding upward from the center of the lid body 4.

The main body 3 and the lid body 4 of the cooking device 1 are formed from flammable material. In the present embodiment, as the flammable material, paper material such as cardboard is used. As the flammable material, wood material such as balsa, or plant-derived material such as straw can be used. The plant-derived material can be plant-derived plastic or the like.

The main body 3 and the lid body 4 of the cooking device 1 are formed from material that emits no toxic substance when being burned. More specifically, the main body 3 and the lid body 4 are formed by stacking and assembling a plurality of components made of cardboard and no adhesive is used to assemble the main body 3 and the lid body 4. A method for assembling the cooking device 1 will be described later in detail with reference to the drawings.

In the present embodiment, the size of the main body 3 (the diameter and height of the main body 3) and the size of the lid body 4 (the diameter of the lid body 4) of the cooking device 1 are determined in accordance with the heating and cooking time of ingredients. More specifically, the size of the main body 3 of the cooking device 1 (the diameter and height of the main body 3) and the size of the lid body 4 (the diameter of the lid body 4) are designed to be larger with increase in the heating and cooking time of ingredients, and the size of the main body 3 of the cooking device 1 (the diameter and height of the main body 3) and the size of the lid body 4 (the diameter of the lid body 4) are designed to be smaller with decrease in the heating and cooking time of ingredients.

The thicknesses of the main body 3 and the lid body 4 of the cooking device 1 are determined in accordance with the heating and cooking time of ingredients. More specifically, the thicknesses of the main body 3 and the lid body 4 of the cooking device 1 are designed to be larger with increase in the heating and cooking time of ingredients, and the thicknesses of the main body 3 and the lid body 4 of the cooking device 1 are designed to be smaller with decrease in the heating and cooking time of ingredients.

Figure 3:
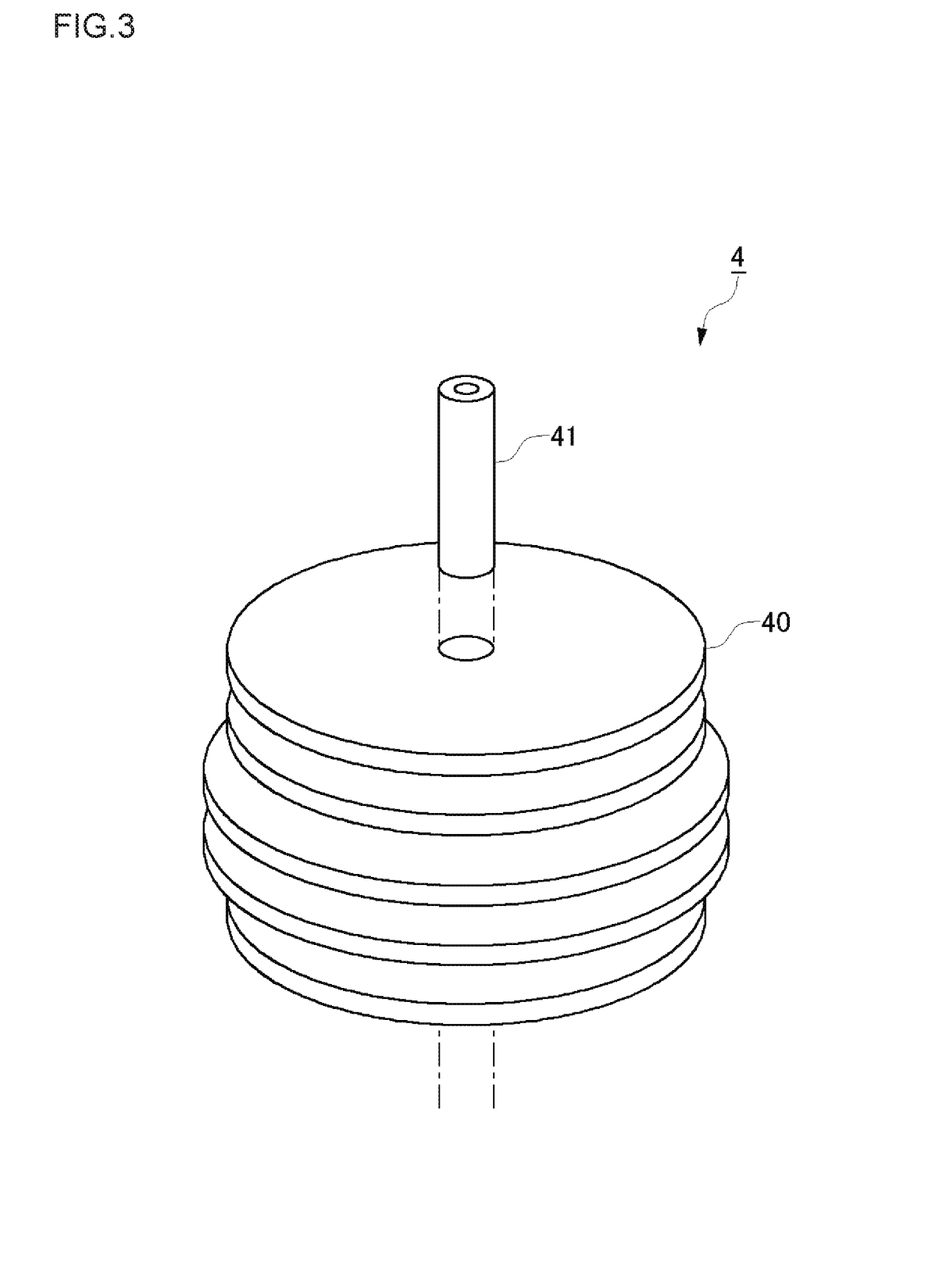
FIG. 3 is a diagram describing a method for assembling a lid body of the cooking device in the embodiment of the present invention.
Figure 4:
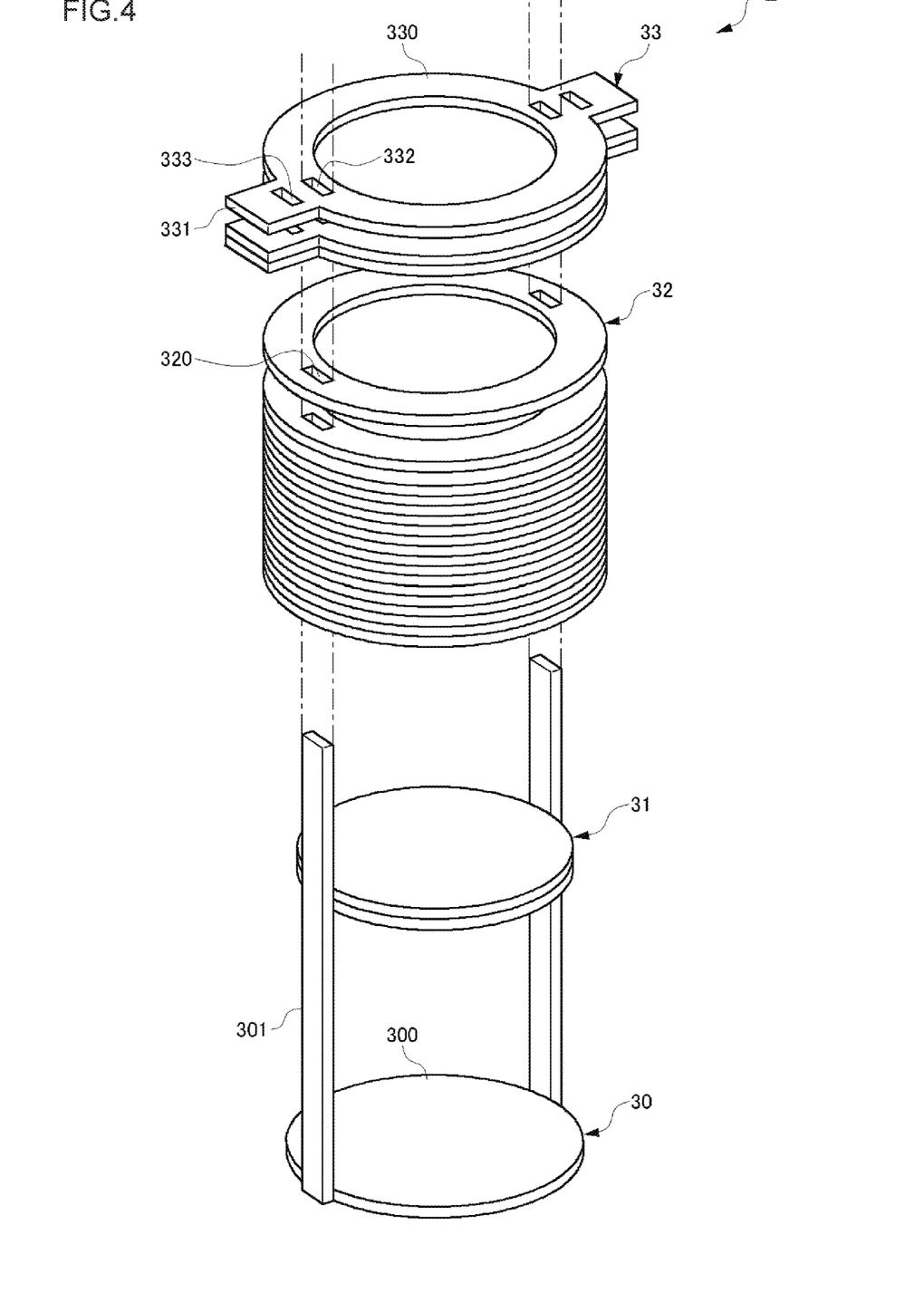
FIG. 4 is a diagram describing the method for assembling a main body of the cooking device in the embodiment of the present invention.

Next, a method for assembling the cooking device 1 will be described with reference to FIGS. 3 to 10. As illustrated in FIGS. 3 and 4, the main body 3 and the lid body 4 of the cooking device 1 are formed by stacking and assembling a plurality of components made of cardboard.

As illustrated in FIG. 3, the lid body 4 includes a plurality of (five in the example of FIG. 3) disc-shaped lid components 40 and a cylindrical knob component 41. A circular hole 400 is provided in the center of the lid components 40. While the plurality of lid components 40 is stacked, the knob component 41 is inserted into the hole 400 in the lid components 40 to assemble the lid body 4.

As illustrated in FIG. 4, the main body 3 includes a base component 30 at the bottom, a plurality of bottom plate components 31 stacked on the base component 30, a plurality of trunk components 32 stacked on the bottom plate components 31, and a plurality of handle components 33 stacked on the trunk components 32. The base component 30 includes a disc-shaped part 300 and a pair of strip parts 301 extending upward from the right and left both ends of the disc-shaped part 300. The bottom plate component 31 has the shape of a disc. The trunk components 32 have the shape of a flat annular plate. Each of the trunk components 32 is provided with a pair of insertion holes 320 into which the strip parts 301 are to be inserted. Each of the handle components 33 includes a flat plate-shaped annular part 330 and a pair of protrusion parts 331 protruding outward from the right and left both ends of the annular part 330. The annular part 330 is provided with a pair of inner insertion holes 332 into which the strip parts 301 are to be inserted, and the protrusion parts 331 are provided with a pair of outer insertion holes 333 into which the strip parts 301 are to be inserted.

Figure 5:
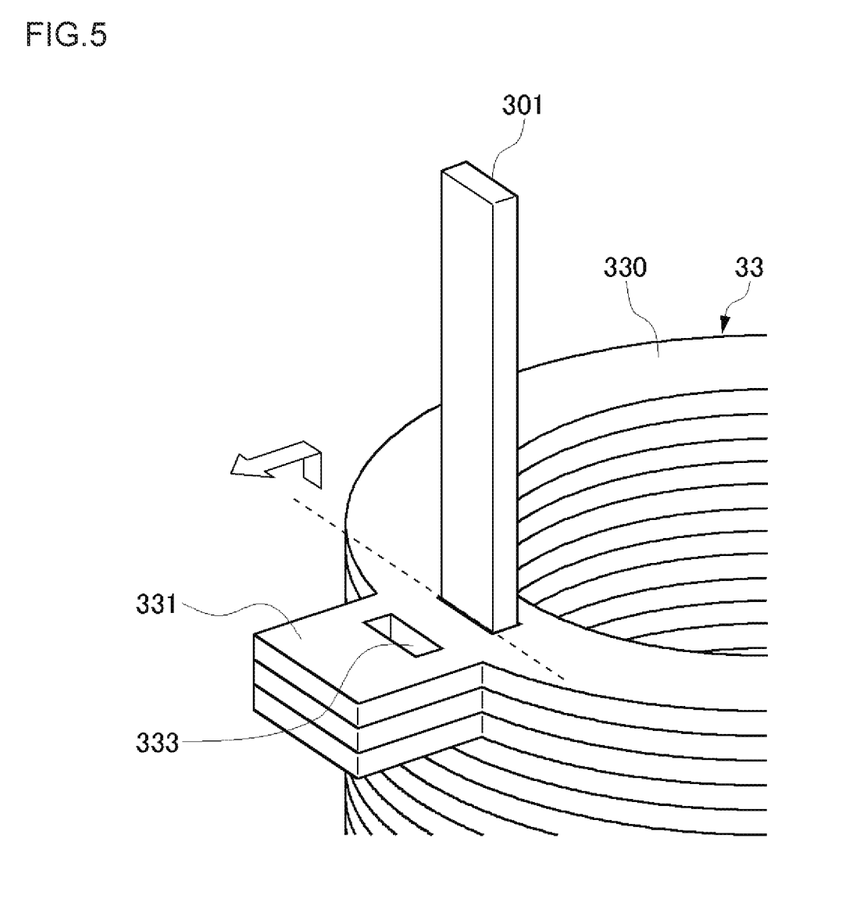
FIG. 5 is a diagram describing the method for assembling the main body of the cooking device in the embodiment of the present invention.
Figure 6:
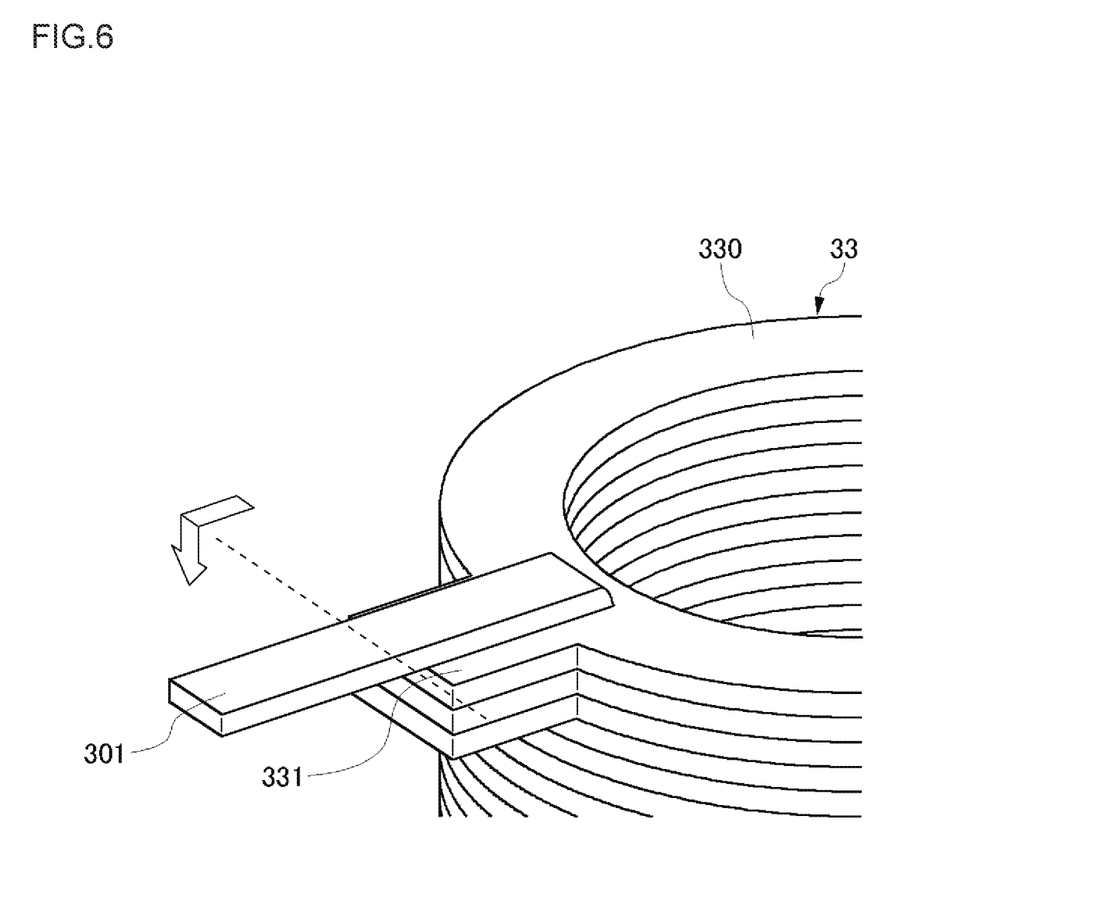
FIG. 6 is a diagram describing the method for assembling the main body of the cooking device in the embodiment of the present invention.
Figure 7:
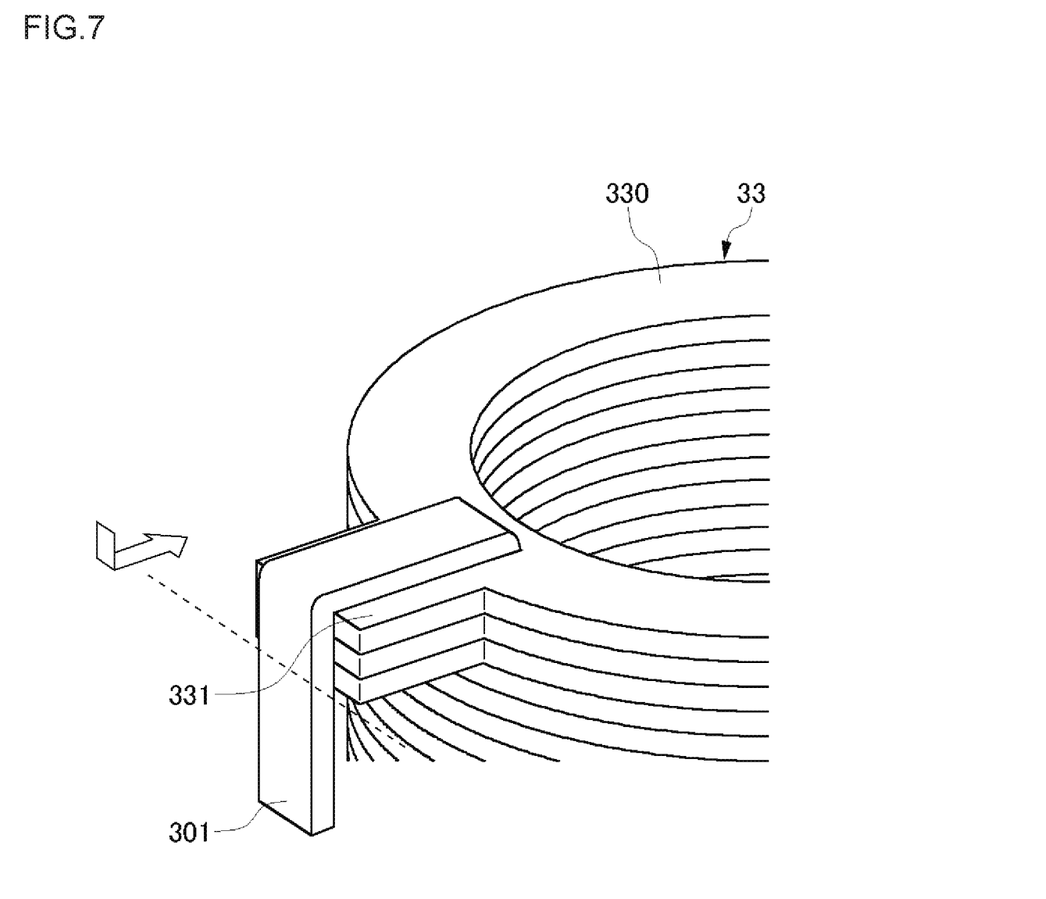
FIG. 7 is a diagram describing the method for assembling the main body of the cooking device in the embodiment of the present invention.
Figure 8:
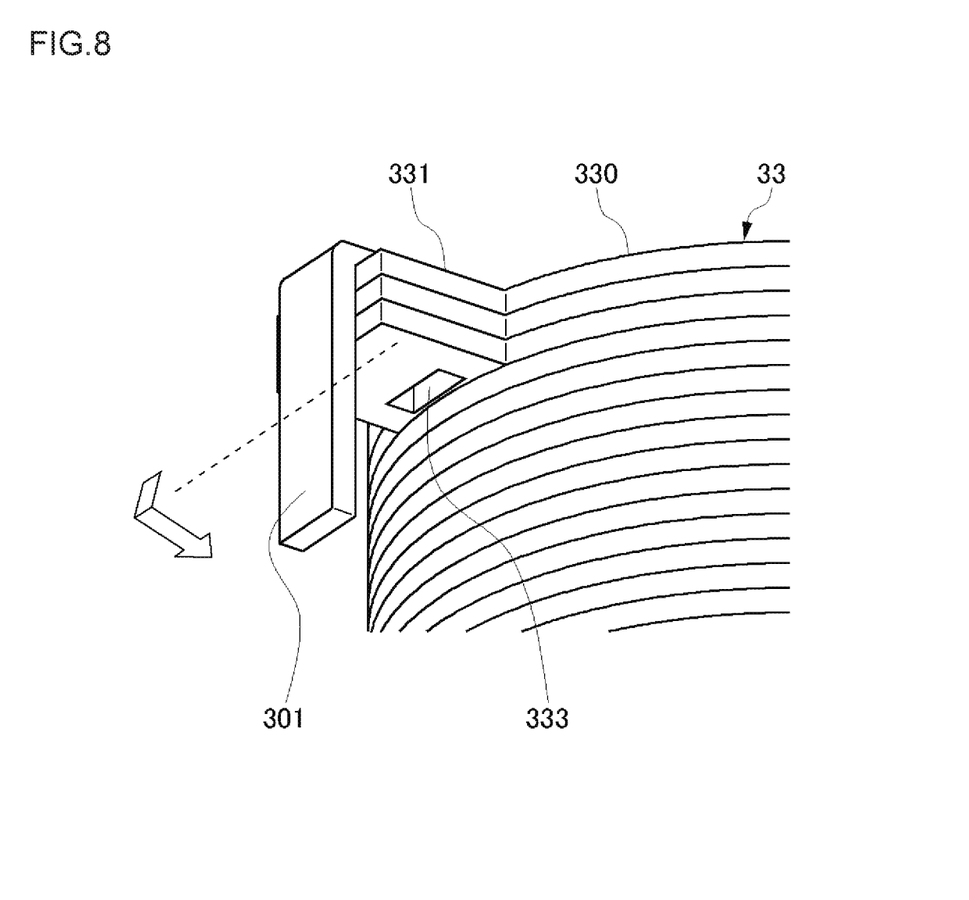
FIG. 8 is a diagram describing the method for assembling the main body of the cooking device in the embodiment of the present invention.
Figure 9:
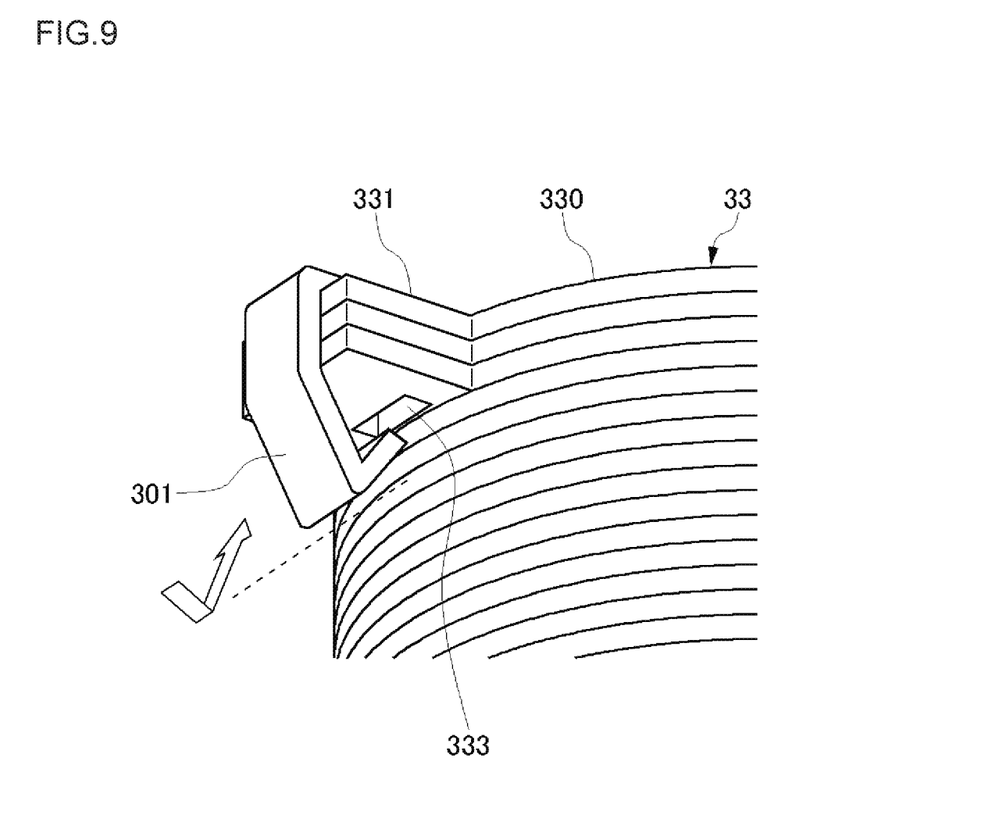
FIG. 9 is a diagram describing the method for assembling the main body of the cooking device in the embodiment of the present invention.
Figure 10:
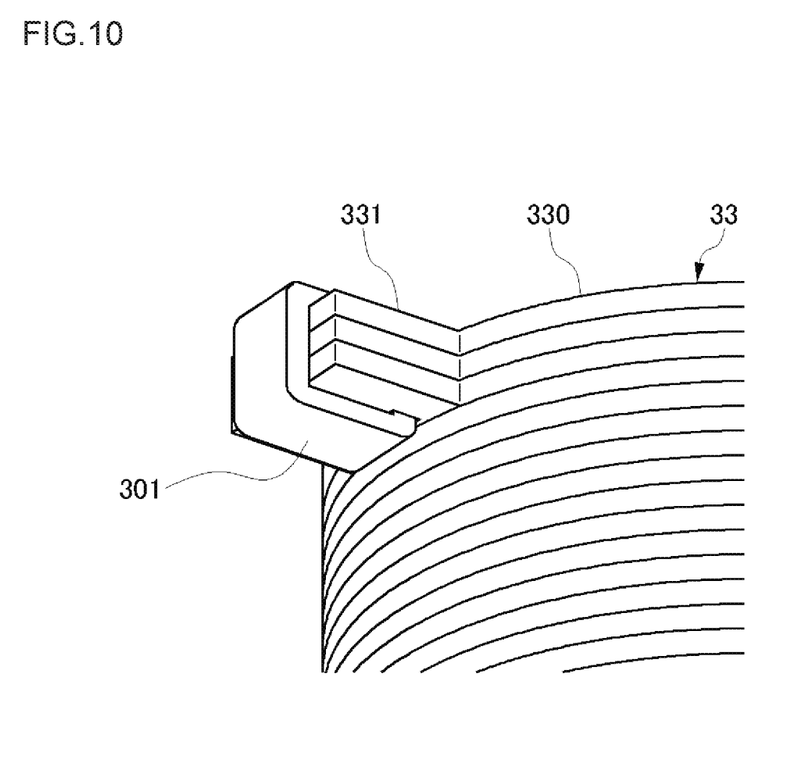
FIG. 10 is a diagram describing the method for assembling the main body of the cooking device in the embodiment of the present invention.

To assembly the main body 3, as illustrated in FIG. 4, the base component 30, the bottom plate component 31, the trunk components 32, and the handle components 33 are stacked in order from the bottom, and the strip parts 301 of the base component 30 are inserted into the insertion holes 320 of the trunk components 32 and the inner insertion holes 332 of the handle components 33 from the underside. In addition, as illustrated in FIG. 5, the strip parts 301 of the base component 30 are folded outward along the upper surfaces of the protrusion parts 331 of the handle components 33. Then, as illustrated in FIG. 6, the strip parts 301 of the base component 30 are folded downward along the outer periphery of the protrusion parts 331 of the handle components 33. Further, as illustrated in FIGS. 7 and 8, the strip parts 301 of the base component 30 are folded along the lower surfaces of the protrusion parts 331 of the handle components 33. Then, as illustrated in FIGS. 9 and 10, the strip parts 301 of the base component 30 are folded and inserted into the outer insertion holes 333 of the handle components 33 from the underside. Accordingly, the main body 3 is assembled.

To use the cooking device 1 assembled as described above, first, ingredients are stored in the concave part 2 of the main body 3, the concave part 2 is covered with the lid body 4, and then the ingredients are put on fire and burned altogether with the cooking device 1. When the cooking device 1 is burned out, the heating and cooking of the ingredients are completed.

According to the cooking device 1 in the present embodiment, the main body 3 and the lid body 4 of the cooking device 1 are formed from flammable material. Thus, with the ingredients stored in the concave part 2 in the main body 3 of the cooking device 1 and the concave part 2 covered with the lid body 4, the ingredients can be heated and cooked by being put on fire and burned altogether with the cooking device 1.

In the present embodiment, as the flammable material for the main body 3 and the lid body 4 of the cooking device 1, paper material such as cardboard, wood material such as balsa, or plant-derived material such as straw can be used. The plant-derived material can be plant-derived plastic or the like.

In the present embodiment, the main body 3 and the lid body 4 of the cooking device 1 are formed from the material that emits no toxic substance when being burned (for example, no adhesive is used). Thus, when the ingredients are heated and cooked by burning together with the cooking device 1, the cooking device emits no toxic substance with improvement in safety and security.

In the present embodiment, the size of the main body 3 (the diameter and height of the main body 3) and the size of the lid body 4 (the diameter of the lid body 4) of the cooking device 1 are determined in accordance with the heating and cooking time of ingredients, which makes it possible to heat and cook the ingredients in an appropriate heating and cooking time only by burning the cooking device 1.

In the present embodiment, the thicknesses of the main body 3 and the lid body 4 of the cooking device 1 are determined in accordance with the heating and cooking time of ingredients, which makes it possible to heat and cook the ingredients in an appropriate heating and cooking time only by burning the cooking device 1.

The embodiment of the present invention has been described so far as an exemplification. However, the scope of the present invention is not limited to the embodiment. The present invention can be changed or modified according to the purpose of use within the scope of the claims.

For example, it has been described above that the cooking device 1 has the shape of a pot (formed by the main body 3 and the lid body 4). However, the shape of the cooking device 1 is not limited to this. The cooking device 1 may have any shape as far as it has a storage part in which cooking ingredients are to be stored.

As described above, the cooking device according to the present invention provides an advantageous effect that ingredients can be heated and cooked by burning altogether with the cooking device, which is effectively used as a camping gear or an outdoor gear.

REFERENCE SIGNS LIST

1: Cooking device
2: Concave part
3: Main body
4: Lid body
5: Handle part
6: Knob part
30: Base component
31: Bottom plate component
32: Trunk component
33: Handle component
40: Lid component
41: Knob component
300: Disc-shaped part
301: Strip part
320: Insertion hole
330: Annular part
331: Protrusion part
332: Inner insertion hole
333: Outer insertion hole
400: Hole part

What is claimed is:

1. A cooking device comprising:
 a main body that has a concave part in which cooking ingredients are to be stored; and
 a lid body that covers the concave part, wherein
 the main body comprises a base component, a bottom plate component stacked on top of the base component, a plurality of annular plate-shaped trunk components stacked on top of the bottom plate component, and a plurality of retainers, each engaging the base component, the bottom plate component, and the trunk components to attach the base component, the bottom plate component, and the trunk components together;
 the base component, the bottom plate component, and the trunk components of the main body, and the lid body, are formed from flammable material wherein no adhesive is used, and
 the base component, the bottom plate component, and the trunk components of the main body, and the lid body, each have a respective thickness such that, when the cooking device is put on fire and burned with the ingredients stored in the concave part and the concave part covered with the lid body, the ingredients are heated and cooked in a heating and cooking time and only the cooking device is burned.

2. The cooking device according to claim 1, wherein the flammable material is paper material, wood material, or plant-derived material.

3. The cooking device according to claim 1, wherein the flammable material is material that emits no toxic substance when being burned.

4. The cooking device according to claim 1, wherein the cooking device is configured to burn a predetermined length of time based on the sizes of the main body and the lid body.

5. The cooking device according to claim 1, wherein the cooking device is configured to burn a predetermined length of time based on the thicknesses of the main body and the lid body.

6. The cooking device according to claim 1, wherein
 the main body further comprises one or more annular handle components, each having a protrusion part protruding away from the concave part of the main body, stacked on top of the annular trunk components; and
 the plurality of retainers each engage the one or more handle components to attach the one or more handle components to a topmost one of the trunk components.

7. The cooking device according to claim 1, wherein the trunk components each comprise a pair of insertion holes; and
 the retainers each comprise a strip part for engaging one of the insertion holes of each of the trunk components.

8. The cooking device according to claim 6, wherein the handle components and trunk components each comprise a pair of insertion holes; and
 the retainers each comprise a strip part for engaging one of the insertion holes of each of the handle components and the trunk components.

9. The cooking device according to claim 1, wherein the base component and the bottom plate component are disc-shaped.

* * * * *